United States Patent
Weir

(10) Patent No.: US 10,718,543 B2
(45) Date of Patent: Jul. 21, 2020

(54) METHOD AND APPARATUS FOR AVOIDING FROST OR ICE BUILD-UP ON VENT PIPES

(71) Applicant: FROSTFREE VENTING INC., Calgary (CA)

(72) Inventor: Lesley W. Weir, Calgary (CA)

(73) Assignee: FROSTFREE VENTING INC., Calgary (CA)

( * ) Notice: Subject to any disclaimer, the term of this patent is extended or adjusted under 35 U.S.C. 154(b) by 9 days.

(21) Appl. No.: 15/769,183

(22) PCT Filed: May 11, 2016

(86) PCT No.: PCT/CA2016/050539
§ 371 (c)(1),
(2) Date: Apr. 18, 2018

(87) PCT Pub. No.: WO2017/066867
PCT Pub. Date: Apr. 27, 2017

(65) Prior Publication Data
US 2018/0306460 A1 Oct. 25, 2018

Related U.S. Application Data

(60) Provisional application No. 62/244,276, filed on Oct. 21, 2015.

(51) Int. Cl.
*F24F 12/00* (2006.01)
*F24F 7/02* (2006.01)
(Continued)

(52) U.S. Cl.
CPC .............. *F24F 12/002* (2013.01); *F24F 7/02* (2013.01); *F24F 11/41* (2018.01); *F28D 15/04* (2013.01);
(Continued)

(58) Field of Classification Search
CPC .. F24F 12/002; F24F 11/41; F24F 7/02; F24F 1/20; F24F 2012/005; F24F 1/0325;
(Continued)

(56) References Cited

U.S. PATENT DOCUMENTS 4,665,714 A  5/1987  Keller
4,723,533 A  2/1988  Cover
(Continued)

FOREIGN PATENT DOCUMENTS

CA  2414934  7/2001
CA  2414934  1/2002
(Continued)

OTHER PUBLICATIONS

Patent Cooperation Treaty International Search Report dated Aug. 11, 2016.
(Continued)

*Primary Examiner* — Tho V Duong
(74) *Attorney, Agent, or Firm* — Parlee McLaws LLP; Susan Rancourt

(57) ABSTRACT

Described herein is an apparatus and method for avoiding frost and ice buildup in and on vent pipes that transport a stream of gas from the inside to the outside of a building. The apparatus and method comprise a heat-conducting path that extracts heat energy from the stream of gas exiting the vent pipe, and transfers this energy to the frost and ice condensing surfaces at or near the terminus of the vent pipe. The heat-conducting path comprises a heat pipe. In one embodiment the heat-conducting path further comprises a heat exchanger. The passive transfer of heat energy via the heat-conducting path, from the stream of gas to the condensing surfaces of the vent pipe, avoids frost and ice buildup in or around the terminus of the vent pipe.

15 Claims, 6 Drawing Sheets

(51) Int. Cl.
*F28D 15/04* (2006.01)
*F28F 1/20* (2006.01)
*F24F 11/41* (2018.01)
*F16L 53/30* (2018.01)

(52) U.S. Cl.
CPC ............... *F28F 1/20* (2013.01); *F16L 53/30* (2018.01); *F24F 2012/005* (2013.01); *Y02B 30/563* (2013.01)

(58) Field of Classification Search
CPC . F24F 12/00; F24F 13/00; F24F 11/42; F28D 15/04; F28D 15/0275; E03C 1/122; F25D 21/00; F25D 21/04; F16L 53/00; F16L 53/70; F28F 1/20; Y02B 30/563
See application file for complete search history.

(56) References Cited

U.S. PATENT DOCUMENTS

| | | | |
|---|---|---|---|
| 4,752,217 A | 6/1988 | Justus | |
| 5,113,669 A | 5/1992 | Coffinberry | |
| 5,129,387 A * | 7/1992 | Behrens | E03C 1/122 126/570 |
| 5,214,266 A * | 5/1993 | Halone, Jr. | E03C 1/122 219/201 |
| 5,282,456 A | 2/1994 | Smelcer et al. | |
| 5,309,732 A | 5/1994 | Sami | |
| 5,321,946 A | 6/1994 | Abdelmalek | |
| 5,595,030 A * | 1/1997 | Pulscher | F24F 7/02 52/218 |
| 5,600,106 A | 2/1997 | Langley | |
| 5,771,707 A | 6/1998 | Lagace et al. | |
| 6,019,123 A | 2/2000 | Gibbs | |
| 6,102,030 A | 8/2000 | Brown et al. | |
| 7,543,630 B2 * | 6/2009 | Lai | F28D 15/0233 165/104.26 |
| 7,655,883 B2 * | 2/2010 | Heise | E03C 1/122 219/213 |
| 8,327,836 B2 | 12/2012 | Brown et al. | |
| 2002/0123305 A1 | 9/2002 | Tocher | |
| 2009/0017746 A1 | 1/2009 | Clemenz | |
| 2009/0183858 A1 | 7/2009 | Williams | |

FOREIGN PATENT DOCUMENTS

| | | | |
|---|---|---|---|
| EP | 1136757 | 9/2001 | |
| JP | 62284194 A * | 12/1987 | ............ F28D 15/02 |
| JP | 2014035132 | 2/2014 | |
| JP | 2015021679 | 2/2015 | |
| WO | WO-2012059250 A1 * | 5/2012 | ............... F28F 1/40 |
| WO | WO-2015087035 A1 * | 6/2015 | ............. F24F 13/30 |

OTHER PUBLICATIONS

Patent Cooperation Treaty Written Opinion of the International Searching Authority dated Aug. 9, 2016.

* cited by examiner

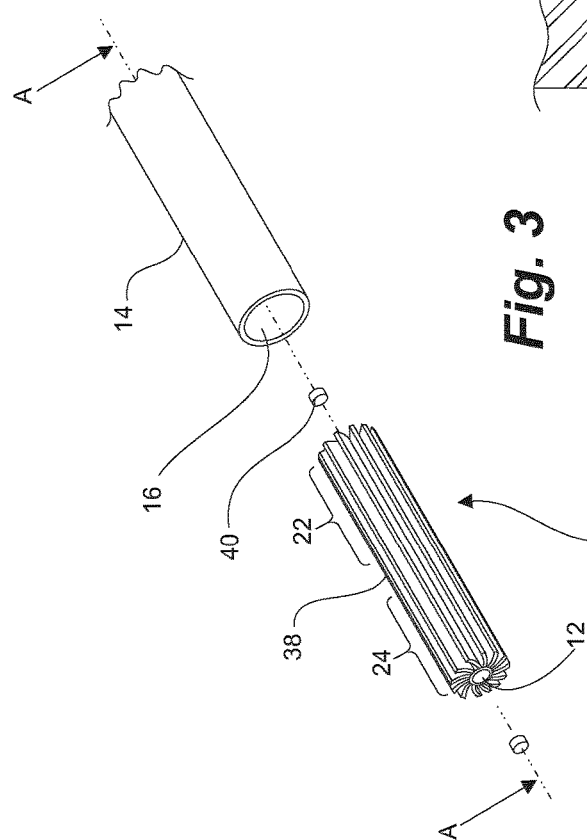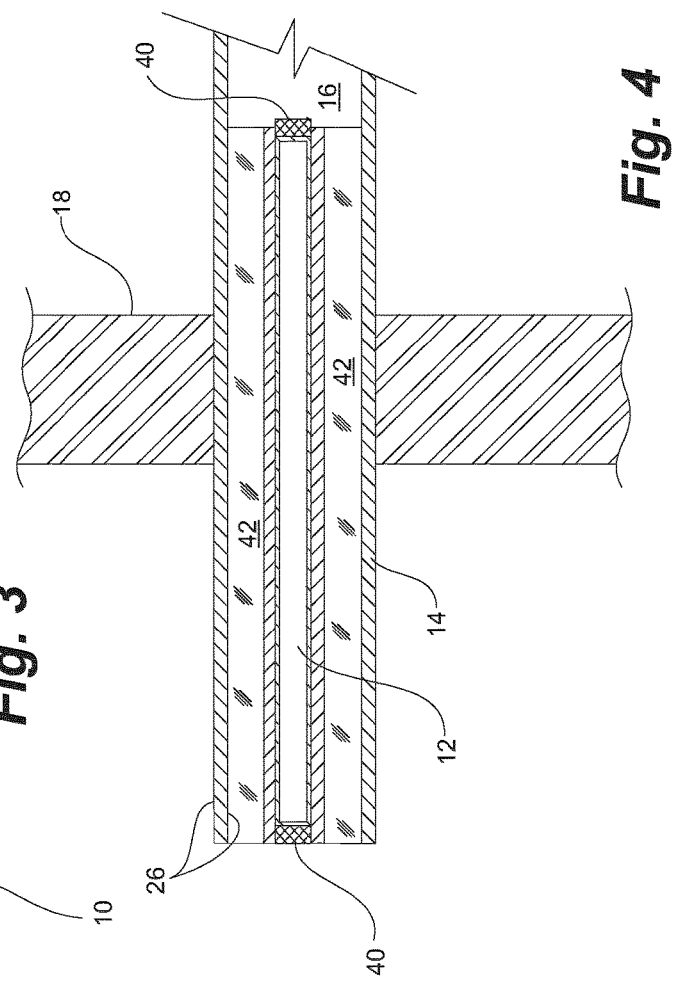

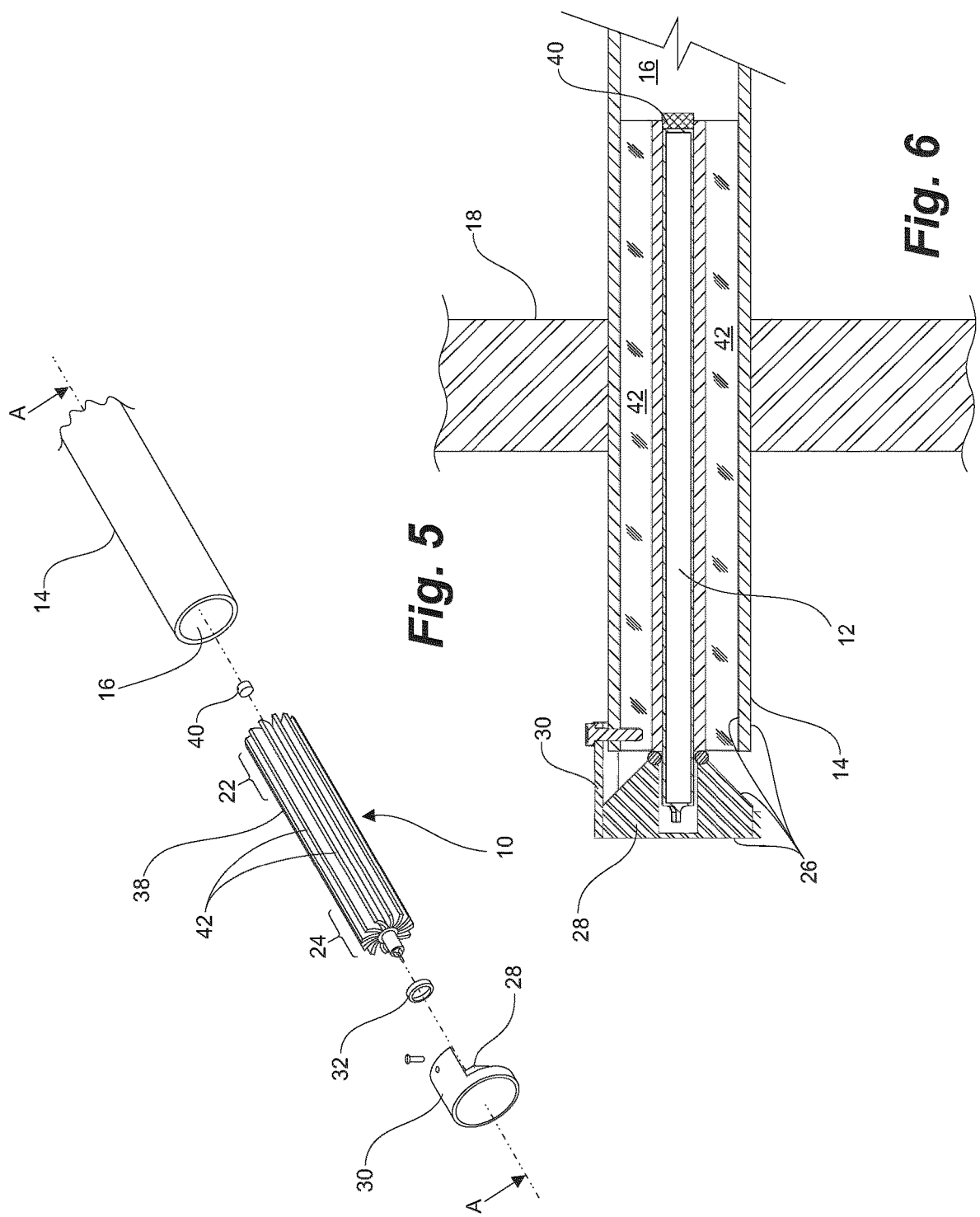

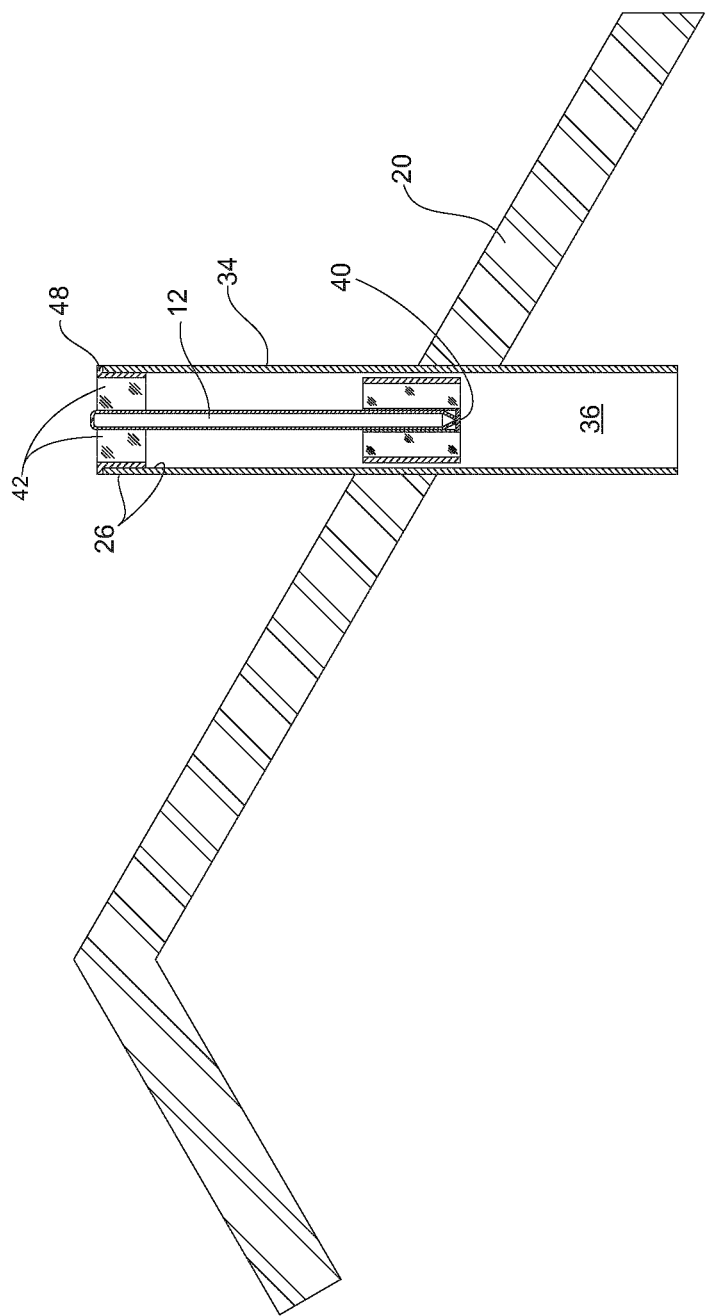

METHOD AND APPARATUS FOR AVOIDING FROST OR ICE BUILD-UP ON VENT PIPES

FIELD

A product and method for avoiding or preventing the accumulation of frost or ice on a vent pipe, such as the exhaust vent terminus and/or redirection fitting from a condensing appliance, or a vent stack.

BACKGROUND

Combustion appliances burn fuels for heating, cooking, or decorative purposes. Examples of combustion appliances include boilers, furnaces and water heaters. Combustion, or burning, is a high-temperature exothermic chemical reaction between a fuel and an oxidant, which in the case of combustion appliances is atmospheric oxidant. Common fuels used by these appliances are natural or liquefied petroleum gas and fuel oil.

The gaseous product of combustion is comprised primarily of water vapor, carbon dioxide and heat, and also harmful compounds such as carbon monoxide and nitrogen dioxide. It is desirable to vent this gaseous product to the outside atmosphere of a building or house (hereafter "building"), which is why combustion appliances all have flues (ducts or pipes) which dispose the combustion product to the outside atmosphere.

High efficiency combustion appliances, known as "condensing" appliances, extract additional heat from the gaseous combustion product before it is released to the outside atmosphere, by condensing the water vapour in the gas to liquid water, thus recovering its latent heat of vaporization. An exhaust gas of lower temperature is then vented to the outside. Condensing appliances range in efficiency from 83% to 98%, thus a typical increase of efficiency in a condensing appliance over a non-condensing appliance can be as much as 10-15%.

Traditional (i.e., non-condensing) combustion appliances were vented through the roof, as the buoyancy of the hot combustion gas could be relied upon to move the gas up through a chimney flue and out of the building. However, because so much heat is removed from the combustion gas of condensing appliances, the gas has a lower-temperature and these appliances must use forced venting systems to ensure proper exhaust gas flow. Because of this forced venting and water condensation, high-efficiency appliances cannot use a natural draft chimney. All condensing appliances must be individually vented in North America, and can be vented through the sidewall of a building, or through the roof. In Europe group venting of appliances is practiced.

An "exhaust" vent is a conduit which vents exhaust gas from a condensing appliance to the outside atmosphere. Sidewall exhausts are commonly discharged close to the ground, adjacent to the building and on the same side of the building. There are two basic systems for installing a two-pipe configuration (as opposed to a one-pipe configuration where air for combustion is taken from the room that the appliance is in). One is a side-by-side configuration, which uses adjacent conduits for the exhaust and air intake that terminate at two separate locations (see e.g., FIG. 1A which shows sidewall venting). The second is a concentric pipe configuration that has an exhaust pipe inside air intake pipe, both of which terminate at the same location (see e.g., FIG. 1B which shows sidewall venting). Concentric pipe configurations commonly comprise an anti-mixing baffle to isolate the air intake opening from the exhaust vent opening. These two basic venting configurations can be used to vent condensing appliances vertically, for example through an existing chimney chase, or horizontally, for example through a sidewall.

On cold days in cooler climates, the moisture plume from the exhaust vent of condensing appliances is clearly visible. If sidewall venting is used, warm moist exhaust gas moves up the wall of the building to any overhangs above, and/or is ejected into the space between adjacent buildings. As it encounters the cooler surfaces of a building it can condense and cause ice buildup. In areas where there is little distance between adjacent buildings, the exhaust gas from one building can cause ice buildup on the adjacent building. It is a common practice to install a redirection fitting on the vent termination to minimize the amount of moisture impacting the buildings opposite the vent termination. This practice increases the ice condensing surface area of the vent termination and additional icing takes place as a result of this practice. If two or more buildings vent exhaust gas into the same space, the air in that space can become very moist, exacerbating the buildup of ice. Ice buildup can also occur in and around the exhaust vent itself, impeding venting of the exhaust gas—not only will the appliance no longer function, it becomes a safety concern.

US 2002/0123305 by Tocher describes a fresh air intake that is allegedly designed to avoid plugging up during the winter with frost and snow. The intake comprises galvanized metal with a metal screen that has ¼" open squares.

U.S. Pat. No. 6,102,030 to Brown et al. describes a concentric furnace exhaust and intake configuration allegedly designed to avoid mixing of exhaust gas with intake air. In this device, the exhaust vent is configured as a nozzle to accelerate the exhaust gas away from the intake pipe and it is also disposed asymmetrically to further discourage the mixing of combustion air and exhaust gas.

US 2009/0017746 by Clemenz et al. describes an apparatus used for preventing the accumulation of snow, ice, frost and hail into or out of a building. The apparatus has a screen that is electrically connected to a heating device. The apparatus may be incorporated into new pipes or attached onto existing pipes.

U.S. Pat. No. 8,327,836 to Brown et al. describes a combined air intake and exhaust vent assembly that is attached to a pair of pipes extending outward from the side of a building. In this assembly the vent and intake terminals are separated and placed in side-by-side relationship.

FIG. 2 shows a drain-waste-vent system, known in the prior art, which removes sewage and greywater from a building, and regulates air pressure in the waste-system pipes to aid free flow. All of the water drains in a house are generally connected to a main vent stack which goes up through the attic and sticks out on the roof of the house. This vent pipe, or vent stack, allows air to flow in the drain system and prevents water flowing down a drain in the house from trying to draw air through drain traps under sinks and in toilets. Without vent piping, or when a vent pipe is blocked, the water in the drain traps can be sucked out, letting sewer gas into the house. This gas, primarily composed of air, water vapor and organic gases, will have an obvious "sewer" smell; however, some harmful gases are odorless and the vent gases could be compromised of gases containing $H_2S$ from a septic system or a flammable vapor such as gasoline, if it were allowed to enter the sanitary sewer system serving the household which the vent stack is connected to.

Blockage of the vent stack can occur when ice builds up at the top of the stack, called "ice capping". There are three mechanisms that can cause icing of the vent stack, and they can occasionally work together:

- wet blowing snow with at just the right temperature conditions, can deposit the ice on the top;
- hot water miming down a drain, for example from a hot shower, gives off steam. This steam finds its way up the plumbing vent and out the top of the house. During extended periods of very cold weather, particularly in Northern climates, the upper portion of the vent pipe is much colder than the portions of the pipe that are in the house. The water in the steam condenses and then freezes to the top of the vent pipe before it escapes out the top; and
- hard, drifted snow can plug the end of the vent stack pipes.

A traditional way to remove the ice cap is to climb up on the roof and pour boiling water down the pipe. Occasional ice capping may be avoided by wrapping insulation around the pipe in the attic space right up to the underside of the roof to keep the steam hotter longer. Or, an insulated box can be built around the vent stack on the roof. In situations where insulation isn't sufficient, a thermostatically controlled electric heating cable (heat tape) which keeps the end of the vent pipe warm can be used, optionally with insulation around the cable. However, if not installed correctly this can cause fires. Another possible solution is a total replacement for the top of the plumbing stack using an apparatus that starts inside the attic and is connected to electricity inside the attic to avoid running wires to or around the vent.

There remains a need for a means of reducing or eliminating the deposition of frost and ice at the terminus of an exhaust vent of condensing appliances, at the terminus of a plumbing stack vent, or at the terminus of other vents, particularly in colder climates. It would be desirable if the solution to these problems did not require the use of an external power source, but rather could be self-sustaining.

SUMMARY

Described herein is an apparatus and method that prevents the laminar flow deposition of frost or ice at or near the terminus of a vent pipe, such as an exhaust vent of a combustion appliance, or a stack vent.

In one aspect provided herein is a heat-conducting path sized for insertion into the terminus of a vent pipe that transfers a stream of gas from the inside to the outside of a building, which comprises:
a) a heat pipe,
b) a heat-absorbing section configured to absorb heat energy from the stream of gas, and
c) a heat-dissipating section configured to dissipate absorbed heat energy to frost and/or ice condensing surfaces on the vent pipe.

In one embodiment the heat-absorbing section comprises the evaporator section of the heat pipe. In one embodiment the heat-dissipating section comprises the condenser section of the heat pipe.

In some embodiments the heat-absorbing section further comprises a first heat exchanger, and in some embodiments the first heat exchanger is disposed on the heat pipe. In some embodiments the heat-dissipating section further comprises a second heat exchanger and in some embodiments the second heat exchanger is disposed on the heat pipe.

In some embodiments the heat-conducting path has both a first heat exchanger and a second heat exchanger, and the first and second heat exchangers are contiguous. In other embodiments the heat-conducting path has both a first heat exchanger and a second heat exchanger, and the first and second heat exchangers are not contiguous.

In some embodiments the first and/or second heat exchanger is a finned heat exchanger and in some embodiments the finned heat exchanger has curved fins.

In some embodiments the vent pipe further comprises a redirection fitting, and the heat-dissipating section is configured to dissipate absorbed heat energy to frost and/or ice condensing surfaces on the redirection fitting.

In another aspect described herein is a method of reducing ice and/or frost buildup at or near the terminus of a vent pipe that transfers a stream of gas from the inside to the outside of a building, which comprises:
a) inserting a heat pipe into the vent pipe at or near the terminus of the vent pipe;
b) transferring heat energy from the stream of gas to the evaporator section of the heat pipe, and
c) transferring heat energy from the condenser section of the heat pipe to the frost and/or ice condensing surfaces, to avoid ice and/or frost buildup at or near the terminus of the vent pipe.

In some embodiments the vent pipe has a redirection fitting, and the method further comprises transferring heat energy from the condenser section of the heat pipe to frost and/or ice condensing surfaces of the redirection fitting.

In some embodiments the method further comprises transferring the heat energy from the stream of gas to the evaporator section of the heat pipe via a first heat exchanger. In some embodiments the method further comprises transferring the heat energy from the condenser section of the heat pipe to the frost and/or ice condensing surfaces via a second heat exchanger.

In some embodiments the method further comprises disposing the first heat exchanger on the evaporator section of the heat pipe. In some embodiments the method further comprises the second heat exchanger on the condenser section of the heat pipe.

In another aspect described herein is a heat-conducting path sized for insertion into the terminus of a vent pipe that transfers a stream of gas from the inside to the outside of a building, comprising:
a) a heat pipe comprising an evaporator section and a condenser section,
b) a first finned heat-exchanger thermally connected to the evaporator section of the heat pipe, said first finned heat-exchanger being configured to absorb heat energy from the stream of gas and to transfer this heat energy to the evaporator section, and
c) a second finned heat exchanger thermally connected to the condenser section of the heat pipe, said second finned heat exchanger being configured to absorb heat energy from the condenser section and to transfer this heat energy to frost and/or ice condensing surfaces on the vent pipe.

In some embodiments the evaporator section of the heat pipe is inserted into the first finned heat exchanger. In some embodiments the condenser section of the heat pipe is inserted into the second finned heat exchanger. In some embodiments the first and second finned heat exchangers are contiguous.

In some embodiments the vent pipe is a vent stack, and the heat-conducting path further comprises a means for holding the heat-conducting path at or near the terminus of the vent stack. In some embodiments the means for holding the heat-conducting path at or near the opening of the vent stack is disposed on the second finned heat exchanger. In some embodiments the means for holding the heat-conducting path at or near the opening of the vent stack is a circumferential stop disposed on the second finned heat exchanger.

BRIEF DESCRIPTION OF THE DRAWINGS

FIG. 3 is an exploded view of an embodiment of the apparatus for insertion into an exhaust vent of a condensing appliance.

FIG. 4 is a cross section through section A-A of the assembled embodiment of FIG. 3.

FIG. 5 is an exploded view of an embodiment of the apparatus for insertion into an exhaust vent of a condensing appliance; the exhaust vent has a redirection fitting.

FIG. 6 is a cross section through section A-A of the assembled embodiment of FIG. 5.

FIG. 8 is a cross section through section A-A of the assembled embodiment of FIG. 7.

DETAILED DESCRIPTION

Figure 1A:
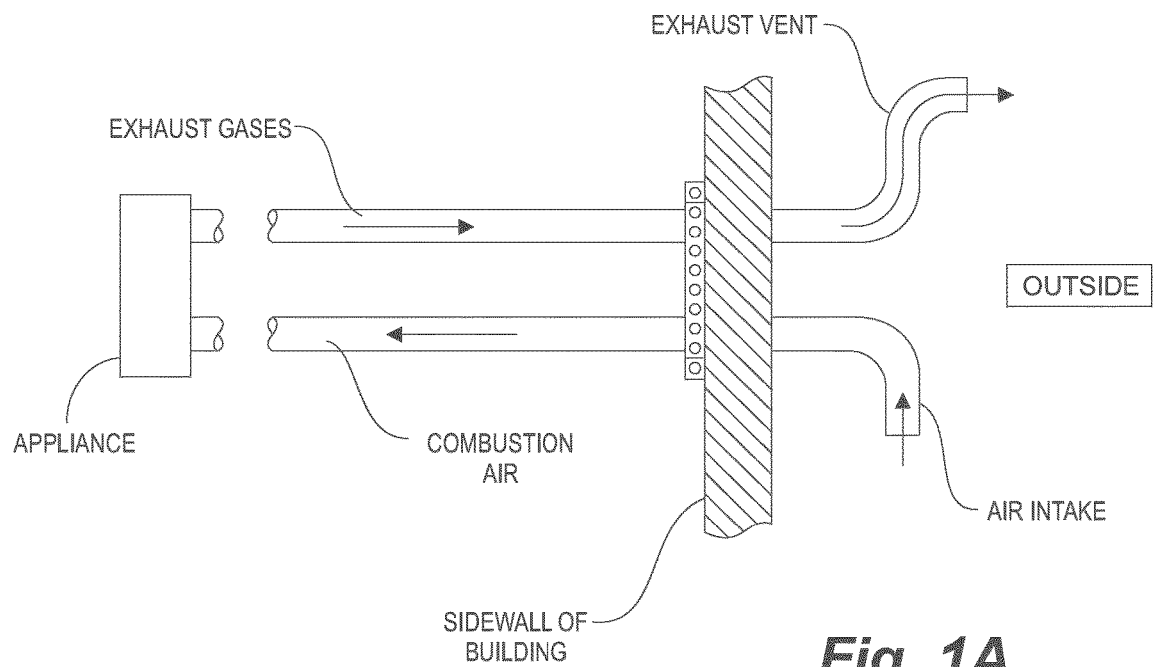
FIGS. 1A and 1B are side views of two different venting configurations known in the prior art and used for venting condensing appliances to the outside atmosphere of a building.
Figure 1B:
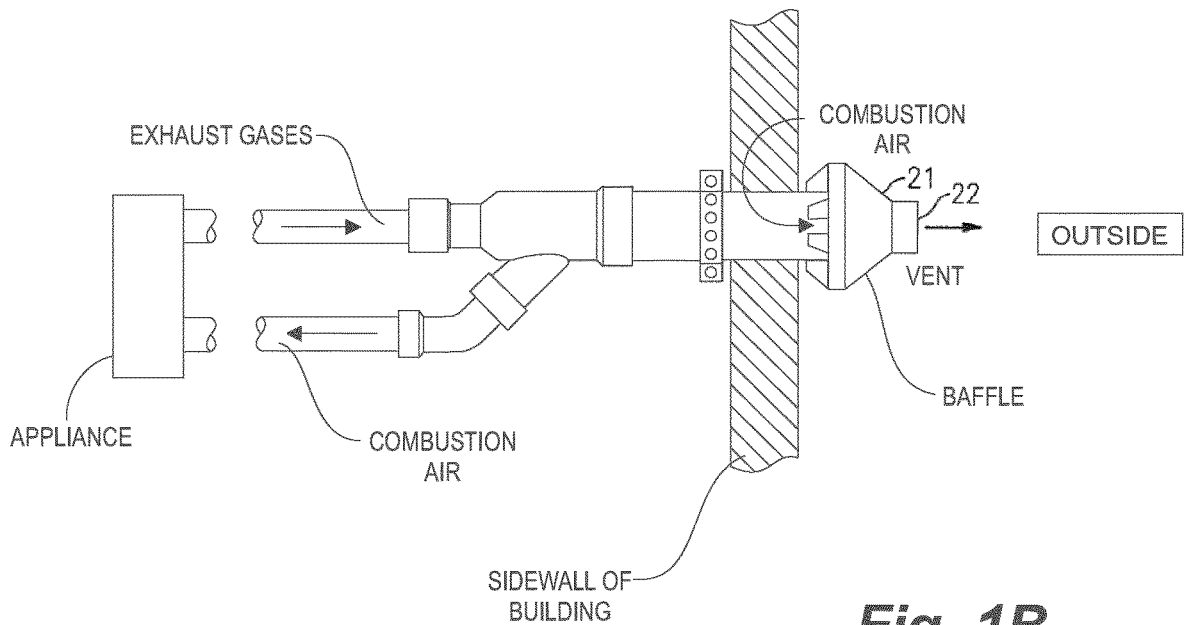
Figure 2:
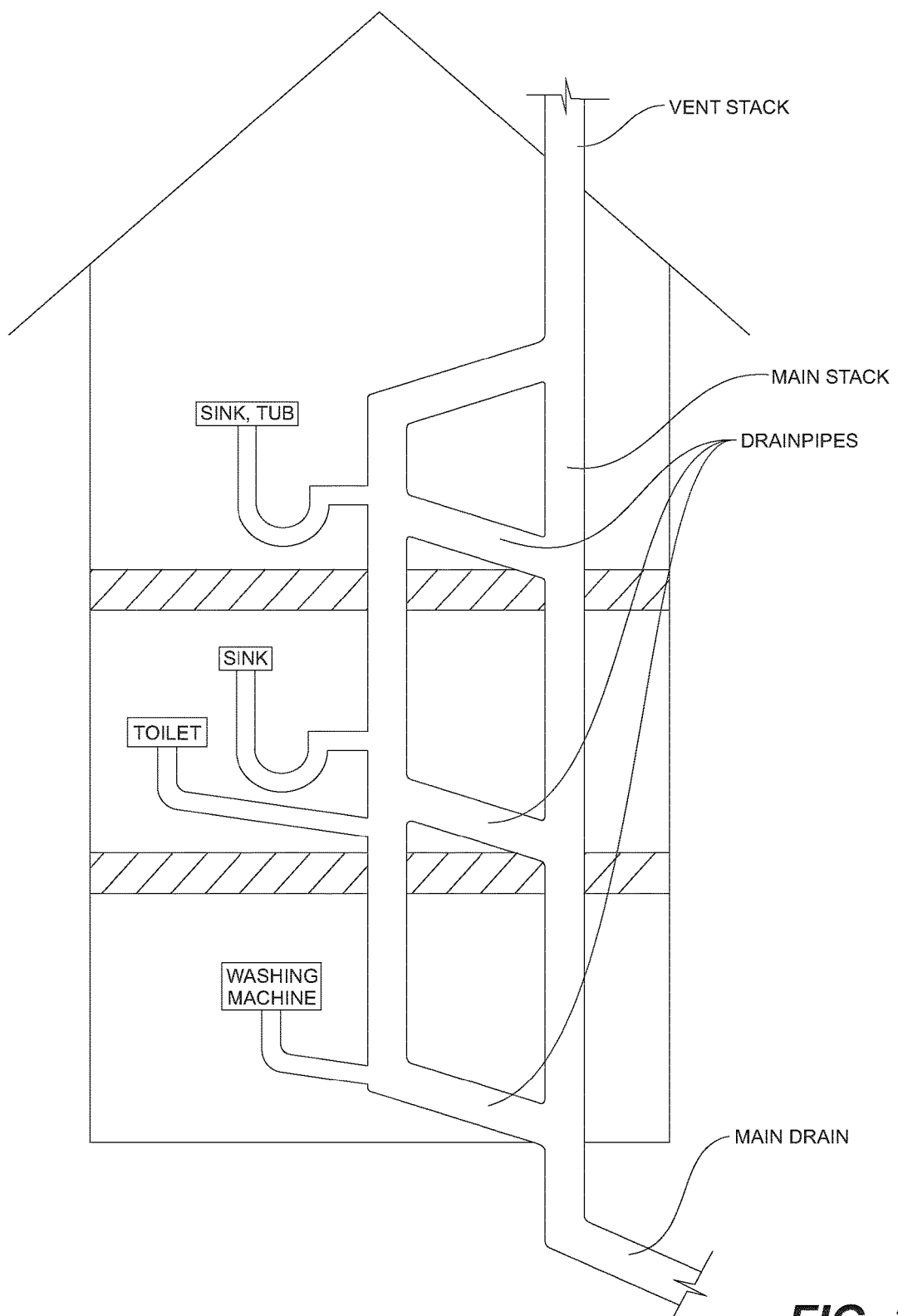
FIG. 2 is drawing of a drain-waste-vent system known in the prior art.

Described herein is an apparatus and method that prevents the deposition of ice and/or frost at or near the terminus of a vent pipe that transports a stream of gas from the inside to the outside of a building. The apparatus and method may be used in residential and light commercial buildings, and may be incorporated into new vents pipes or installed into existing vent pipes. The apparatus may further be adapted to prevent the deposition of ice and frost on a redirection fitting on an exhaust vent that leads from a condensing appliance or a group of condensing appliances.

The apparatus and method use a heat-conducting path to transfer heat from the stream of gas that is transported along the vent pipe to the ice and/or frost condensing surfaces at or near the terminus of the vent pipe, and in a further embodiment to a termination fitting on the vent pipe. The heat-conducting path is preferably made at least in part of a material that can be subjected to several freeze-thaw cycles, and to potentially corrosive gases in the stream of gas. The heat-conducting path may be made of a metal, an alloy, a resin, a mineral, a heat-conducting polymer, or the like, that has high thermal conductivity, e.g., without limitation steel, copper and aluminum. In some embodiments the heat-conducting path comprises a heat pipe. In some embodiments the heat-conducting path comprises heat exchangers in conjunction with a heat pipe. In some embodiments the heat exchangers are finned/plated heat exchangers. In some embodiments the heat-conducting path may be coated with a material that provides protection from corrosion by compounds in the stream of gas, but that will not interfere substantially with heat energy transfer.

The "ice/frost condensing surfaces" of the vent pipe are the surfaces of the pipe or redirection fitting onto which ice and/or frost will deposit at colder temperatures. These surfaces are generally located at or near the vent pipe terminus (i.e., opening or exit) and may be on the outside or inside of the vent pipe terminus. More particularly, the disclosure herein provides for a heat-conducting path that absorbs the heat energy from an outbound stream of gas travelling along a vent pipe, and that moves this heat energy forward (i.e., towards the terminus of the pipe), after which it is transferred directly or indirectly to the ice/frost condensing surfaces. By transferring heat energy to the ice/frost condensing surfaces, these surfaces are heated sufficiently to reduce or eliminate the deposition of frost and/or ice on them.

"Direct" heat transfer to the ice/frost condensing surfaces occurs by physical contact between the heat-conducting path and these surfaces, and the transfer of heat by conduction to these surfaces. Direct heat transfer also occurs by the transfer of radiant energy from the heat-conducting path to these surfaces. "Indirect" heat transfer to the ice/frost condensing surfaces occurs when the heat energy is transferred from the heat-conducting path to an intermediary, such as the exiting stream of gas or an intermediary structure, and then this heat energy is conveyed from the intermediary to the condensing surfaces by way of convection or conduction.

As used herein, "thermal contact" or "thermally connected" means either a direct contact or connection (e.g., physical contact), or an indirect contact or connection via an intermediary element (e.g., air, or a physical structure that conducts heat).

The "stream of gas" in the vent pipe may comprise water vapour which, under suitable conditions, may condense into frost or ice. In the case of a condensing appliance, the stream of gas is exhaust gas and may further comprise air, gaseous residual $CO_2$, other compounds (e.g., CO) and particulates remaining after the combustion product of a condensing appliance has been condensed to remove at least some of its heat energy. In the case of a vent stack, the stream of gas is sewage gas and may further comprise air, methane, CO, nitrogen, hydrogen sulphide and other compounds. Streams of gas exiting from vents other than plumbing vents or exhaust vents of condensing appliances are also contemplated herein.

As used herein, the term "vent pipe" refers to an exhaust gas vent (or flue, duct, pipe) which transports exhaust gas from a condensing appliance to the outside of a building, a plumbing vent stack/pipe connected to pipes which transport wastewater from the plumbing of a building to the outside of the building, or any other such vent, duct or pipe which transports a stream of gas from the inside to the outside of a building.

The apparatus described herein provides a heat-conducting path that is disposed in the stream of gas flowing along and exiting the vent pipe. The heat-conducting path is in thermal contact with the stream of gas and with the ice/frost condensing surfaces. The heat-conducting path comprises a heat-absorbing section which extracts heat energy from the stream of gas and a heat-dissipating section which releases the heat energy at or near the vent pipe terminus. This release of heat energy will heat the ice/frost condensing surfaces, to reduce or eliminate the deposition of ice and/or frost on these surfaces.

When the heat-conducting path is disposed in the vent pipe, the heat-absorbing section of the heat-conducting path is internal to the heat-dissipating section. The heat-conducting path is activated by a temperature difference, and thus consumes no energy. Without being bound by theory, the inventor believes that the heat-absorbing path functions by moving the absorbed and concentrated heat energy forward to the terminus of the vent pipe, where it is released. The transfer of heat energy along the heat-conducting path between the stream of gas and the ice/frost condensing surfaces of the vent pipe is passive. Further, because there are no moving parts, essentially no maintenance is required except for an occasional cleaning.

Having thus described the basic apparatus and method herein, specific embodiments will now be described, as shown in the accompanying Figures.

FIGS. 3 and 4 show an embodiment of the heat-conducting path 10 disclosed herein which may be used in an exhaust vent 14 of a condensing appliance. When exhaust gas is discharged from the vent of a high efficiency condensing appliance, the gas meets the cold air and condenses, creating moisture that can collect and freeze on surfaces around and inside the terminus of exhaust vents. If severe enough, the ice can significantly impede air flow and cause the appliance to shut down.

The exhaust vent or conduit 14 defines an exhaust gas passageway 16, and is inserted horizontally through the wall 18 of a building or vertically through a roof of the building. The exhaust vent 14 may a single exhaust pipe used in a side-by-side venting or an exhaust pipe used in a concentric venting system (FIGS. 1A, B) and may be the exhaust for one or a group of condensing appliances. The heat-conducting path 10 is disposed in the bore of the exhaust vent 14 and extends from within the vent to about the terminus of the exhaust vent. The heat-conducting path 10 comprises a heat-absorbing section 22 internal to the heat-dissipating section 24. The heat-dissipating section 24 is in thermal contact with the ice/frost condensing surfaces 26 at or near the terminus of the exhaust vent 14.

Ice can also accumulate on the ice/frost condensing surfaces of a redirection fitting 28 installed at the terminus of an exhaust vent 14. Thus, in some embodiments the heat-conducting path 10 transfers heat energy to ice/frost condensing surfaces of a redirecting fitting, optionally in addition to the ice/frost condensing surfaces of the exhaust vent 14.

An embodiment of the heat-conducting path 10 that designed to also prevent ice/frost build-up on a redirection fitting is shown in FIGS. 5 and 6. A dispersion cone support collar 30 is used to connect the redirection fitting 28, in this instance a dispersion cone, to the exhaust vent 14. A circumferential O-ring 32 seals this connection. In this embodiment the heat-conducting path 10, and more specifically the heat pipe 12 in the heat-conducting path, extends into a cavity in the body of the redirection fitting, to heat the redirection fitting and consequently the ice/frost condensing surfaces 26 thereof. Other types of redirection fittings are contemplated herein, for example exhaust Y or T termination fittings as are known in the art. These fittings will comprise ice/frost condensing surfaces and the heat-conducting path may be modified to ensure that these surfaces are heated.

Figure 7:
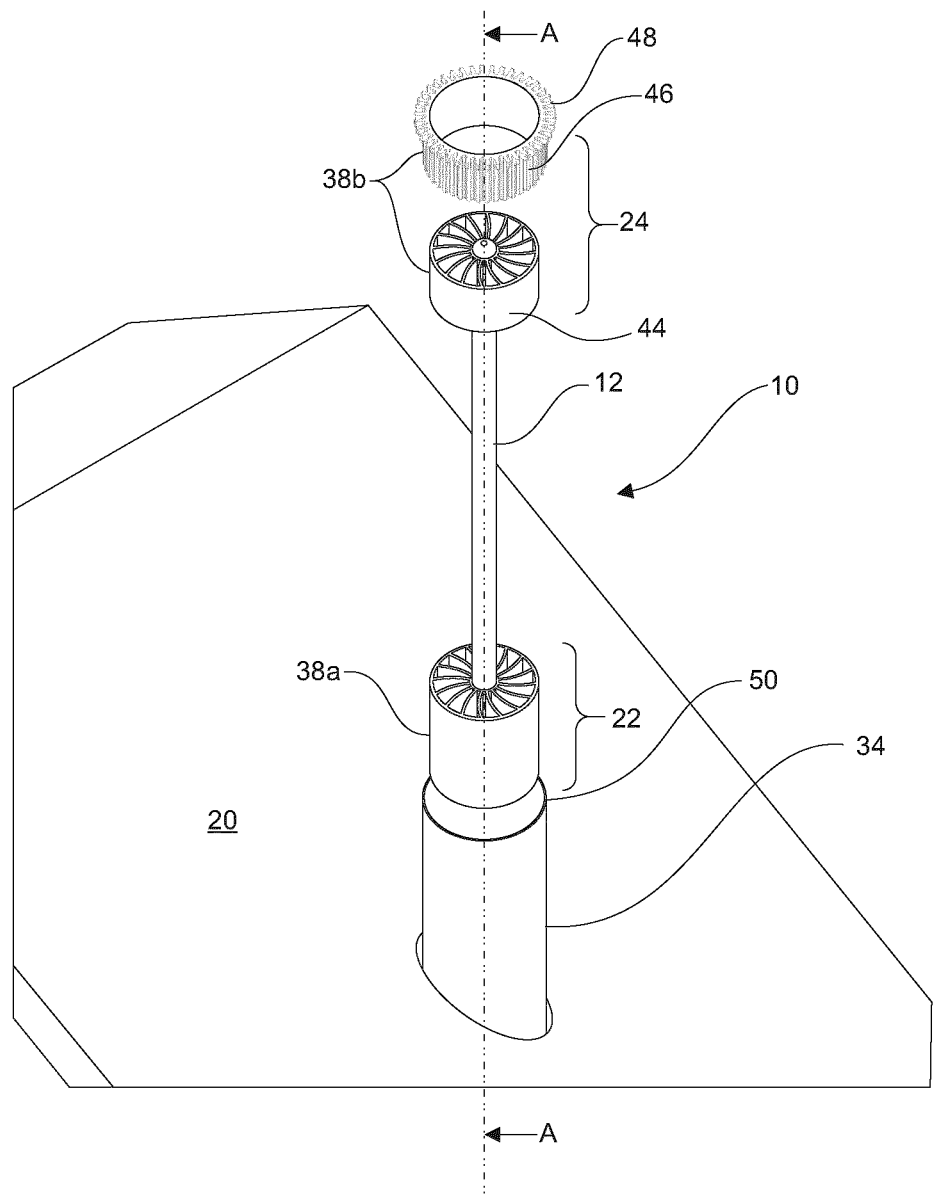
FIG. 7 is an exploded view of an embodiment of the apparatus for insertion into a plumbing vent stack.

FIGS. 7 and 8 show an embodiment of the heat-conducting path 12 disclosed herein which may be used in a vent (plumbing) stack 34. When sewer gas is discharged from the vent stack 34, the gas meets the cold air and condenses, creating moisture that can collect and freeze on surfaces around and inside the vent stack. The vent stack defines a sewer gas passageway 36, and is inserted vertically through the roof 20 of the building. The heat-conducting path 10 is disposed in the bore of the vent stack and extends from within the vent stack to about the terminus of the vent stack. The heat-conducting path 10 comprises a heat-absorbing section 22 which is disposed in the bore of the vent pipe well away from the vent terminus and the heat-dissipating section 24. The heat-dissipating section 24 is in thermal contact with the ice/frost condensing surfaces 26 at or near the terminus of the vent stack 34.

In embodiments the heat-conducting path is more than 10 inches in length. For exhaust vents of combustion appliances, for example, preferred embodiments are about 11 or about 12 inches in length, or even longer. For vent stacks, preferred embodiments are about 15 inches in length. In designing vent pipes themselves is it advantageous to minimize the amount to which they extend from the wall or roof, as this will minimize the amount of surface area that is cooled by the outside environment. Further, for roof vent pipes in particular, it is advantageous to extend the heat-absorbing section as far down the vent pipe as possible, preferably below the sections of the pipe that are in colder attic space, as the air is warmer and there is therefore more heat to be collected by the heat-conducting path. Ultimately the length of the heat-conducting path will be limited by the fact that if it is too long then the energy transferred to the ice/frost condensing surfaces may be insufficient to prevent ice and/or snow deposition. Piping offsets may also interfere with the ability to install a longer heat-conducting path (although contemplated herein are heat-conducting path embodiments that are bent in order to accommodate piping offsets).

As shown in FIGS. 3 to 8, the heat-dissipating section 24 of the heat-conducting path 10 described herein is in thermal contact with the ice/frost condensing surfaces 26 at or near the terminus of the vent pipe. The heat-dissipating section is positioned such that it is able to transmit enough heat energy directly or indirectly to the ice/frost condensing surfaces 26 to avoid deposition of ice or frost thereon. This transfer of heat energy from the heat-dissipating section to the ice/frost condensing surfaces may be accomplished by one or a combination of the following means:

(a) physical contact between the heat-dissipating section and the ice/frost condensing surfaces and conduction of heat energy therebetween;

(b) physical contact between heat-dissipating section and other structures that can conduct heat energy to the ice/frost condensing surfaces;

(c) transferring heat energy to the stream of gas, which transfers this energy by convection to the ice/frost condensing surfaces; and (c) radiation of heat from the surface of the heat-dissipating section to the ice/frost condensing surfaces.

In use, in the embodiments shown in FIGS. 3 to 8, as a stream of gas flows past the heat-absorbing section 22, heat energy is absorbed and is then transferred along heat-conducting path 10 to the heat-dissipating section 24, and consequently to the ice/frost condensing surfaces at or near the terminus of the vent pipe. The stream of gas is therefore cooled by depleting heat energy from it, and the ice/frost condensing surfaces 26 are heated by the energy that is depleted from this gas.

In the embodiments shown in FIGS. 3 to 8, the heat-conducting path comprises a heat pipe 14, and the heat-absorbing section 22 of the heat-conducting path comprises the evaporator section of the heat pipe and the heat-dissipating section 24 of the heat-conducting path comprises the condenser section of the heat pipe. The heat-conducting path shown in FIGS. 3 to 8 is shown with the heat-dissipating section 24 disposed almost entirely within the bore at the terminus of the exhaust vent 14 or vent stack 34; this section may be disposed partly or completely outside of this opening.

Heat pipes are very efficient in transferring heat from one location to another. A heat pipe is a closed metal container, often a tube, which contains a transport fluid in a vacuum until it reaches a boiling point and then becomes pressurized.

When heat is applied to the outside of one end of the heat pipe, the liquid transport fluid inside vapourizes into a vapour that moves through the tube to the other end of the heat pipe which is cooler, and where it condenses back into a liquid. Because the vapourization of a liquid requires energy (the latent heat of vapourization) and the condensation of a vapour releases this energy (the latent heat of condensation), a heat pipe essentially absorbs heat from the environment at the end where vapourization occurs, and releases heat to the environment at the end where condensation occurs.

The inside of a heat pipe can contain a capillary structure such as a wick, which functions to return the condensate to the evaporator end via capillary action, thus allowing the heat pipe to operate irrespective of its orientation in a gravity field. A thermosyphon may be described as a "gravity return heat pipe". Unlike a conventional heat pipe, a wick is not needed in a thermosyphon because gravity moves the transport fluid back to the evaporator section.

The evaporator section of a heat pipe is a heat-absorbing section, the condenser section is a heat-dissipating section, and the two are connected by an essentially adiabatic middle section. The interior of the heat pipe is sealed from the exterior environment, and contains a transport fluid under vacuum that is capable of vapourizing at the evaporator section and condensing at the condenser section under the conditions to which the heat pipe will be exposed. The evaporator section of the heat pipe may be lower than the condenser section of the heat pipe when assembled and in use, so that condensed transport fluid flows from the condenser section to the evaporator section with the assistance of gravity.

The container of the heat pipe may be formed from a thermally-conductive material such as a metallic substance, e.g., without limitation, aluminum, copper, stainless steel, or alloys thereof. The container material is non-porous. Preferably the container material is copper, as it is flexible and can withstand some corrosion. In some embodiments the heat pipe may be coated with a material that provides protection from corrosion by the corrosive gas, but that will not interfere substantially with heat energy transfer (for example baked phenolic coatings that can be obtained from Heresite Protective Coatings LLC).

The heat pipe is hollow and has a sealed interior space that contains a transport fluid that is chosen according to the temperatures at which the heat pipe must operate. The transport fluid will, within the heat pipe, change from liquid to vapour and back again over the operating temperature range of the heat pipe, in this case the temperature at the evaporating end of the heat pipe that is within the vent pipe and the temperature at or near the vent terminus. The transport fluid used herein is, therefore, a substance or combination of substances that can change phase from liquid to vapour when the temperature of the evaporator section attains a predetermined temperature due to the heat energy transferred from the stream of gas, and that can change from vapour to liquid when the temperature of the condenser section attains a predetermined temperature due to the heat energy lost from transfer to ice/frost condensing surfaces. The transport fluid also has sufficient heat capacity to deliver the required heat energy to the condenser, and thereby reduce or prevent ice/frost accumulation at the condensing surfaces. Other considerations for the transport fluid are its compatibility with the wick and wall materials, its thermal stability, wettability of the wick and wall materials, its latent heat, thermal conductivity, viscosity in liquid and vapour form, surface tension and freezing point. The transport fluid may be, for example without limitation, water, methanol, ethanol and ammonia. Preferably the transport fluid is water.

The purpose of the capillary structure or wick, if used, is to generate capillary pressure to transport the liquid transport fluid from the condenser section to the evaporator section. It also distributes the transport fluid around the evaporator section to any area where heat is likely to be received by the heat pipe. The thickness of the wick, its compatibility with the working fluid and wettability are other factors that should be considered in selecting the appropriate wick. The wick may be made of materials such as, without limitation, steel, aluminum, nickel or copper, ceramics and carbon fibres. In one embodiment the heat pipe is a Thermacore® copper-water, sintered powder wick heat pipe which has a sintered copper powder wick structure that operates even against gravity, and can withstand numerous freeze-thaw cycles.

In the environment in which the heat pipe is to be used, and if water is used as the transport fluid, a wick which can freeze and expand internally in the pipe without compromising the operational ability of the pipe is required. Further, the amount of transport fluid used is such that the evaporator and condenser sections are not waterlogged, and is only enough to keep the wick saturated, avoiding amounts that would result in detrimental freezing and consequent damage to the heat pipe.

The volume, shape and dimensions of the heat pipe used in the heat-conducting path described herein can be varied, provided however that the heat pipe is able to deliver an amount of heat energy to the frost/ice condensing surfaces that is sufficient to reduce or prevent ice/frost accumulation, and that it can withstand the thermal cycling and frosting/freezing environments in which it will be used. The configuration of the heat pipe will therefore depend on a number of factors including the size of the vent pipes/conduits, the configuration of the conduits and their distances from one another, the BTUH size of the condensing appliance and the climate, to name a few. The heat-conducting path may have more than one heat pipe and therefore may have more than one evaporator section and more than one condenser section. It may be made of a flexible material if some range of motion is required. It may be a tubular or flat heat pipe, a variable conductance heat pipe, a diode heat pipe, a thermosyphon or a loop heat pipe. Preferably it is tubular.

While embodiments of the method and apparatus described herein contemplate using only a heat pipe as the heat-conducting path, preferred embodiments use a heat pipe 12 in conjunction with a heat exchanger, to increase the heat transfer capacity of the heat-conducting path 10. Therefore, embodiments of the heat-conducting path may further comprise a heat exchanger 38 which functions to absorb heat energy from the stream of gas and transfer this heat energy to evaporator section of the heat pipe; or to absorb heat energy from the condenser section of the heat pipe and transfer this heat energy to the frost and/or ice condensing surfaces. Thus, the heat exchanger 38 may increase the amount of heat energy that is absorbed from the stream of gas and transferred to the heat pipe 12, where it is efficiently moved forward (i.e., outwards toward the vent terminus). Alternately or in addition, the heat exchanger 38 may increase the amount of heat energy that is transferred from the heat pipe 12 to the frost and/or ice condensing surfaces. As seen in the embodiments shown in the Figs. herein, the heat exchanger 38 may have an elongated through channel for receiving the heat pipe therethrough, to establish a thermal connection therewith. Heat pipe stops 40 may be used to hold the heat pipe in the through channel.

In embodiments the heat exchanger 38 increases the amount of heat energy that is transferred (absorbed and dissipated) by increasing the surface area available for heat transfer. In some embodiments the heat exchanger 38 is a plate/finned heat exchanger that extends partially, completely, or in sections (e.g., 2 or 3 sections), along the length of the heat-pipe. In the embodiments shown in FIGS. 3 to 6, a finned heat exchanger 38 extends along the entire, or almost the entire length of the heat pipe 12 of this heat-conducting path, and includes a section that absorbs heat from the stream of gas and a section that dissipates heat to the frost and/or ice condensing surface. Thus, in these embodiments the heat exchangers that perform the absorbing and dissipating functions are contiguous. In the embodiments shown in FIGS. 7 and 8 a finned heat exchanger 38 comprises two parts, 38A and 38B, disposed at about the evaporator and at about the condenser section, respectively, of the heat pipe. Thus this embodiment includes heat exchanger for absorbing heat from the stream of gas and a heat exchanger for dissipating heat to the frost and/or ice condensing surface, and these two heat exchangers are separate entities. Other embodiments contemplated herein (not shown) include a heat exchanger 38 at the evaporator but not the condenser section of the heat pipe, or vice-versa.

In the embodiment shown in FIGS. 7 and 8, heat exchanger part 38B is made of two components, an inner 44 and an outer 46 component that cooperate to absorb the heat from the heat pipe and transfer it to the ice and/or frost condensing surfaces. In particular, the outer component further comprises a circumferential stop 48 which rests on the top end 50 of the vent stack 34. This stop not only transfers heat to the vent stack, but it also prevents the heat-conducting path from sliding downwards into the vent stack. Thus the heat-conducting path embodiment shown in FIGS. 7 and 8 can be easily inserted into and positioned in an existing vent stack. This stop need not be circumferential—for example it may be comprised of sections disposed about the circumference of heat exchanger 38 B. Other means of holding the heat-conducting path at or near the terminus of the vent stack include a stop or lip on the inside of the vent stack, onto which the heat-conducting path could sit, or a clamp which holds the heat-conducting path in the vent stack.

In the embodiments shown in FIGS. 3 to 8, the stream of gas travelling along the vent pipe circulates over and around fins 42, which are optimally designed to provide minimal resistance to airflow while at the same time maximizing surface area for absorption and dissipation of heat. Because the stream of gas may be corrosive, the materials for construction are preferably corrosion resistant. Heat exchanger 38 may be made of a metal, an alloy, a resin, a mineral, a heat-conducting polymer, or the like, that has high thermal conductivity, e.g., without limitation copper and aluminum. Preferred for use herein is aluminum and its alloys, and specifically 6063-T6 aluminum alloy.

Fins 42 may be straight (not shown), or curved as shown in FIGS. 3 to 8. Curved fins have a larger surface area than straight fins, and therefore fewer curved fins than straight fins are needed, for the same heat transfer capacity.

In operation, in the embodiments shown in FIGS. 3 to 8, heat exchanger 38 will absorb heat energy from the stream of gas passing along the vent pipe and transfer this heat energy to heat pipe 12, and/or this heat energy will move forward along the heat exchanger towards the vent pipe terminus. Heat energy received by the heat pipe will be moved forward to the condenser section, after which it may be transferred directly or indirectly to the ice/frost condensing surfaces.

Described herein is a method of avoiding frost and/or ice deposition on surfaces at or near the terminus of a vent pipe which exhausts a stream of gas from the inside to the outside of a building. In this method, a heat-conducting path extracts heat energy from the stream of gas that is exiting the vent pipe and then transfers this heat energy directly or indirectly to these surfaces at or near the terminus of a vent pipe. The method uses, therefore, a heat-conducting path to: (a) extract heat energy from the stream of gas before it exits the vent pipe, (b) move this heat energy forward (e.g., outwards) to the terminus of the vent pipe, and (c) transfer this heat energy directly or indirectly to the frost and/or ice condensing surfaces.

While the heat-conducting path and method have been described in conjunction with the disclosed embodiments which are set forth in detail, it should be understood that this is by illustration only and the method and apparatus are not intended to be limited to these embodiments. On the contrary, this disclosure is intended to cover alternatives, modifications, and equivalents which will become apparent to those skilled in the art in view of this disclosure.

The invention claimed is:

1. A heat-conducting path sized for insertion into the terminus of a cylindrical vent pipe that transfers a stream of gas from the inside to the outside of a building, the vent pipe having a bore and an inside cylindrical surface around the bore, comprising:
 a) a heat pipe,
 b) a heat-absorbing section comprising an evaporator section of the heat pipe, configured to absorb heat energy from the stream of gas,
 c) a heat-dissipating section comprising a condenser section of the heat pipe configured to dissipate absorbed heat energy to frost and/or ice condensing surfaces on the vent pipe,
 d) a first heat exchanger physically connected to the heat dissipating section of the heat pipe, the first heat exchanger having an outer edge configured for thermal contact with the inside cylindrical surface of the vent pipe, and
 e) means on the first heat exchanger for holding the heat-conducting path within the bore of the vent pipe at or near the terminus of the vent pipe,
 wherein absorbed heat energy is transferred from the condenser section of the heat pipe to the first heat exchanger and to the inside cylindrical surface of the vent pipe.

2. The heat-conducting path of claim 1, wherein the heat-absorbing section further comprises a second heat exchanger.

3. The heat-conducting path of claim 2 wherein the second heat exchanger is disposed on the heat-absorbing section of heat pipe.

4. The heat-conducting path of claim 3 wherein the first and second heat exchangers are contiguous.

5. The heat-conducting path of claim 3 wherein the first and second heat exchangers are not contiguous.

6. The heat-conducting path of claim 5 wherein the first and/or second heat exchanger is a finned heat exchanger extending radially from the heat pipe.

7. The heat-conducting path of claim 6 wherein the first and/or second finned heat exchanger has curved fins.

8. The heat-conducting path of claim 1 wherein the heat-dissipating section is further configured to dissipate absorbed heat energy to frost and/or ice condensing surfaces of a redirection fitting on the vent pipe.

9. A heat-conducting path sized for insertion into the terminus of a vent pipe that transfers a stream of gas from the inside to the outside of a building, the vent pipe having an inside cylindrical surface, comprising:
   a) a heat pipe comprising an evaporator section and a condenser section,
   b) a second finned heat-exchanger physically connected to the evaporator section of the heat pipe, said second finned heat-exchanger being configured to absorb heat energy from the stream of gas and to transfer this heat energy to the evaporator section,
   c) a first finned heat exchanger physically connected to the condenser section of the heat pipe, said first finned heat exchanger having an outer cylindrical surface configured to thermally contact the inside cylindrical surface of the vent pipe and thereby transfer the heat energy to the inside surface of the vent pipe, and
   d) means on the first heat exchanger for holding the heat-conducting path within the bore of the vent pipe at or near the terminus of the vent pipe.

10. The heat-conducting path of claim 9, wherein the evaporator section of the heat pipe is inserted into the second finned heat exchanger.

11. The heat-conducting path of claim 9 wherein the first and second finned heat exchangers are contiguous.

12. The heat-conducting path of claim 1 wherein the means for holding the heat-conducting path at or near the terminus of the vent pipe is a circumferential stop on the first heat exchanger.

13. The heat-conducting path of claim 9 wherein the wherein the means for holding the heat-conducting path at or near the terminus of the vent pipe is a circumferential stop on the first heat exchanger.

14. The heat-conducting path of claim 12 wherein the circumferential stop is comprised of a series of sections disposed around the circumference of the first heat exchanger.

15. The heat-conducting path of claim 13 wherein the circumferential stop is comprised of a series of sections disposed around the circumference of the first heat exchanger.

* * * * *